(12) United States Patent
Salam et al.

(10) Patent No.: US 8,948,169 B2
(45) Date of Patent: Feb. 3, 2015

(54) MECHANISM FOR E-VPN INTEROPERABILITY WITH VPLS

(75) Inventors: Samer Salam, Vancouver (CA); Ali Sajassi, San Ramon, CA (US); Sami Boutros, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 13/313,968

(22) Filed: Dec. 7, 2011

(65) Prior Publication Data
US 2013/0148657 A1    Jun. 13, 2013

(51) Int. Cl.
H04L 12/56     (2006.01)
H04L 12/721    (2013.01)
H04L 12/46     (2006.01)

(52) U.S. Cl.
CPC ............ H04L 45/68 (2013.01); H04L 12/4641 (2013.01)
USPC ....... 370/390; 370/392; 370/395.53; 370/400

(58) Field of Classification Search
CPC ...................................................... H04L 45/68
USPC ................. 370/328, 329, 351, 389, 390, 392, 370/395.3, 395.53, 401, 400
See application file for complete search history.

(56) References Cited

U.S. PATENT DOCUMENTS

| | | | |
|---|---|---|---|
| 8,184,526 B2 * | 5/2012 | Duncan et al. | 370/216 |
| 8,259,563 B1 * | 9/2012 | Kothari et al. | 370/225 |
| 8,345,682 B2 * | 1/2013 | Pignataro et al. | 370/389 |
| 2005/0226215 A1 * | 10/2005 | DelRegno et al. | 370/351 |
| 2008/0232384 A1 * | 9/2008 | Miyabe | 370/401 |
| 2009/0285089 A1 * | 11/2009 | Srinivasan | 370/218 |
| 2010/0166005 A1 * | 7/2010 | Jounay et al. | 370/401 |
| 2011/0286452 A1 * | 11/2011 | Balus et al. | 370/390 |
| 2011/0286462 A1 * | 11/2011 | Kompella | 370/395.53 |
| 2012/0177054 A1 * | 7/2012 | Pati et al. | 370/395.53 |
| 2012/0219004 A1 * | 8/2012 | Balus et al. | 370/395.53 |
| 2012/0236734 A1 * | 9/2012 | Sampath et al. | 370/252 |
| 2013/0051376 A1 * | 2/2013 | Hatashita et al. | 370/338 |

OTHER PUBLICATIONS http://tools.ietf.org/html/draft-raggarwa-sajassi-l2vpn-evpn-01
BGP MPLS Based Ethernet VPN, Aggarwal, et al. Nov. 11, 2010 (41 pages).
http://tools.ietf.org/html/draft-sajassi-raggarwa-l2vpn-evpn-req-00
Requirements for Ethernet VPN (E-VPN), Sajassi, et al. Oct. 17, 2010 (14 pages).

* cited by examiner

*Primary Examiner* — Brian D Nguyen
*Assistant Examiner* — Toan Nguyen
(74) *Attorney, Agent, or Firm* — Novak Druce Connolly Bove + Quigg LLP

(57) ABSTRACT

In one embodiment, a network device in a set of network devices obtains a pseudowire label for a Provider Edge (PE) device, where the pseudowire label corresponds to a Virtual Local Area Network (VLAN) on the PE device. In addition, the network device obtains a set of one or more MAC addresses reachable via the PE device, wherein the set of network devices support Ethernet Virtual Private Network (E-VPN) and are in the same redundancy group such that the set of network devices are coupled to the same customer edge device. The network device stores the pseudowire label in association with the set of one or more MAC addresses. The network device uses the pseudowire label to encapsulate traffic associated with the VLAN that is received from the customer edge device and destined to the set of MAC addresses reachable via the PE device.

22 Claims, 7 Drawing Sheets

Obtain by a network device in a set of network devices a pseudowire label for a Virtual Local Area Network (VLAN) and a set of one or more MAC addresses for the VLAN, wherein the set of network devices support Ethernet Virtual Private Network (E-VPN) and are in the same redundancy group such that the set of network devices are coupled to the same customer edge device
402

Store by the network device the pseudowire label in association with the set of one or more MAC addresses
404

Use by the network device the pseudowire label to encapsulate data packets associated with the VLAN that are received from the customer edge device.
406

FIG. 4

Receive by a network device in a set of network devices a pseudowire label for a remote VPLS PE device in a Virtual Local Area Network (VLAN) from a designated forwarder for the VLAN, wherein the designated forwarder for the VLAN is one of the set of network devices, wherein the set of network devices support Ethernet Virtual Private Network (E-VPN) and are in the same redundancy group such that the set of network devices are coupled to the same customer edge device
512

Receive by the network device a set of one or more MAC addresses from the designated forwarder for the VLAN
514

Use by the network device the pseudowire label to encapsulate traffic associated with the VLAN that is received from the customer edge device and addressed to one of the set of MAC addresses
516

FIG. 5B

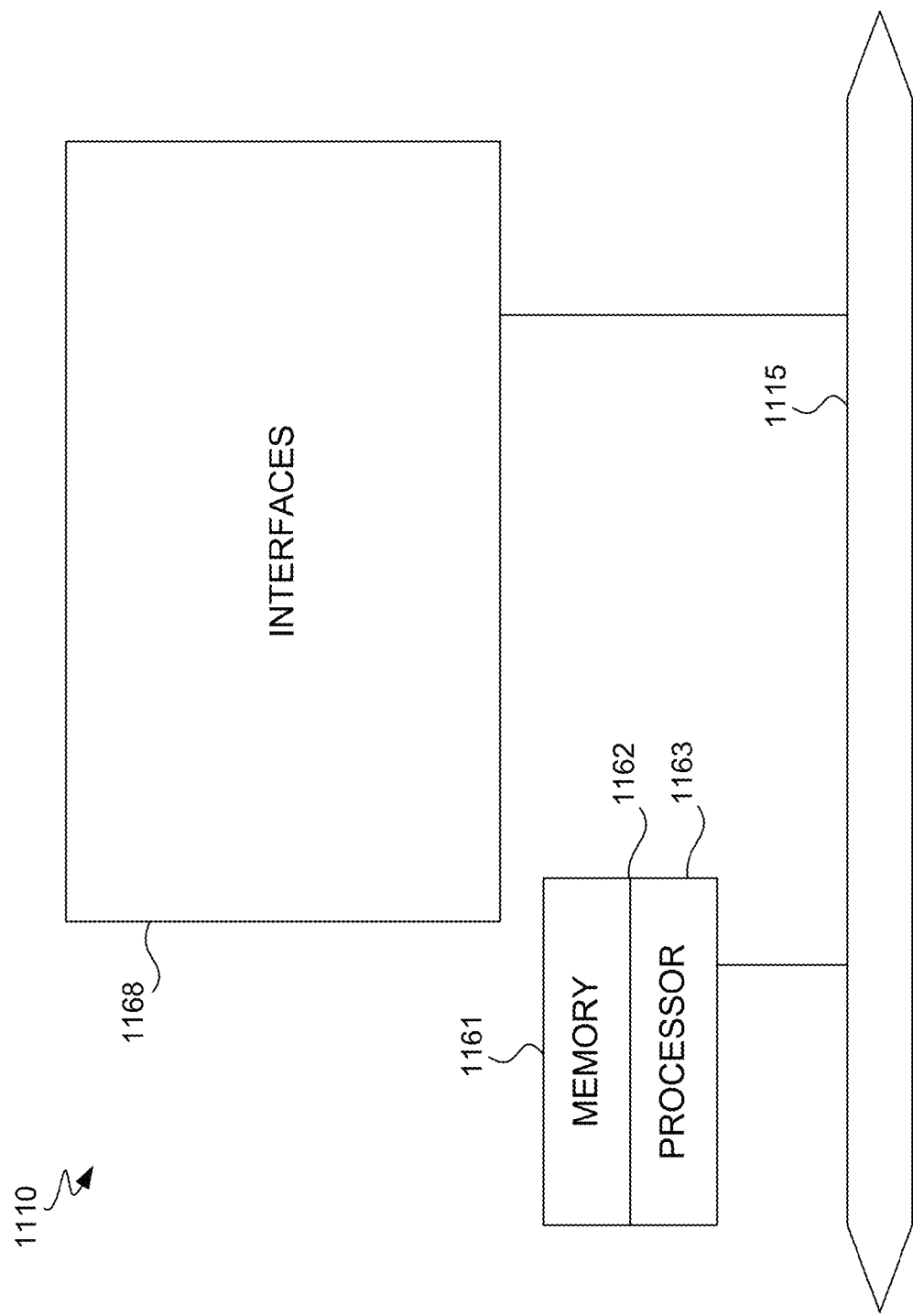

MECHANISM FOR E-VPN INTEROPERABILITY WITH VPLS

BACKGROUND

1. Technical Field

The present disclosure relates generally to a mechanism for Ethernet Virtual Private Network (E-VPN) Interoperability with Virtual Private Local Area Network Service (VPLS).

2. Description of the Related Art

A Layer 2 Multiprotocol Label Switching (MPLS) Virtual Private Network (VPN) is a method that telecommunications Service Providers use to segregate their network for their customers, allowing the customers to transmit data over an Internet Protocol (IP) network. Layer 2 VPNs are a type of VPN that may use MPLS labels to transport Layer 2 frames. The communication typically occurs between routers or switches that are referred to as Provider Edge (PE) devices, since they sit on the edge of the Service Provider's network, next to the customer's network.

Virtual Private Local Area Network Service (VPLS) is a way to provide Ethernet based any-to-any (multipoint to multipoint) communication over Internet Protocol (IP)/Multiprotocol Label Switching (MPLS) networks. It allows geographically dispersed sites to share an Ethernet broadcast domain connecting sites through pseudo-wires. The establishment of VPLS is described in Request for Comments (RFC) 4761, "Virtual Private LAN Service (VPLS) Using BGP for Auto-Discovery and Signaling," Kompella et al, January 2007 and RFC 4762, "Virtual Private LAN Service (VPLS) Using Label Distribution Protocol (LDP) Signaling," Lasserre et al, January 2007.

In a VPLS, the local area network (LAN) or virtual LAN (VLAN) at each site is extended to the edge of the service provider network. The service provider network then emulates a switch or bridge to connect all of the customer LANs or VLANs to create a single bridged LAN or VLAN.

Ethernet Virtual Private Network (E-VPN) is the next generation MPLS-based layer 2 VPN technology. E-VPN supports various capabilities and features that have not previously been supported by VPLS. However, replacing VPLS with E-VPN technology would result in enormous expense to businesses that have invested in VPLS.

BRIEF DESCRIPTION OF THE DRAWINGS

FIG. 4 is a process flow diagram illustrating an example method of operating by a device supporting E-VPN in accordance with various embodiments.

FIG. 5B is a process flow diagram illustrating an example method of operating by a provider edge device supporting E-VPN such as a non-Designated Forwarder in accordance with various embodiments.

FIG. 6 is a diagrammatic representation of an example network device in which various embodiments may be implemented.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

Overview

In one embodiment, a network device in a set of network devices obtains a pseudowire label for a Provider Edge (PE) device, wherein the pseudowire label corresponds to a Virtual Local Area Network (VLAN) on the PE device. In addition, the network device obtains a set of one or more Media Access Control (MAC) addresses reachable via the PE device, wherein the set of network devices support Ethernet Virtual Private Network (E-VPN) and are in the same redundancy group such that the set of network devices are coupled to the same customer edge device. The network device stores the pseudowire label in association with the set of one or more MAC addresses. The network device uses the pseudowire label to encapsulate traffic associated with the VLAN that is received from the customer edge device and is destined to one of the set of MAC addresses reachable via the PE device.

Specific Example Embodiments

Multi-Homing

A Service Provider network typically provides service to customer networks via Provider Edge (PE) devices (e.g., routers or switches) at the edge of the Service Provider network. More particularly, each PE device may be connected to a Customer Edge (CE) device (e.g., router or switch) at the edge of a customer network.

Multi-homing is one possible solution for providing node, link and port redundancy for Service Providers offering Layer 2 Virtual Private Network (VPN) services. For example, Virtual Private LAN Switching (VPLS) multi-homing enables a customer site (e.g., customer network) to be connected to multiple PE devices (e.g., routers or switches). Each customer site may be associated with one of a plurality of customers. Each of the customers may have associated therewith one or more customer sites. A customer may be an entity such as a business, company, organization, or individual.

Figure 1:
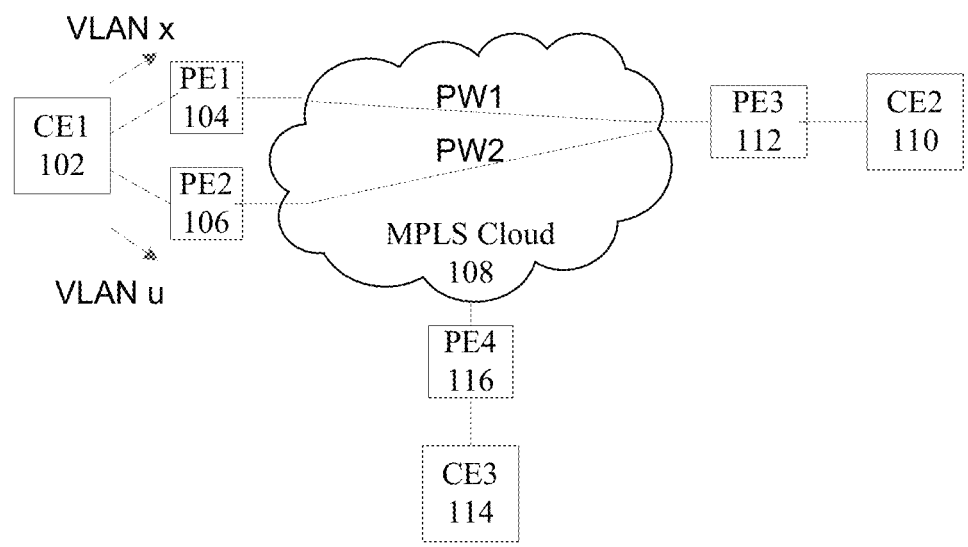
FIG. 1 is a diagram illustrating an example system supporting multi-homing in which VPLS is implemented.

A VPN may connect multiple sites of a customer over the Service Provider network. For example, as shown in FIG. 1, a first site may be connected via a first CE device, CE1 102, to two PE devices, PE1 104 and PE2 106. The two PE devices, PE1 104 and PE2 106, may be connected to a core 108 of a Service Provider network such as a Multi-Protocol Label Switching (MPLS) core. A second site of the same customer may be connected via a second CE device, CE2 110, to one or more PE devices, PE3 112. Similarly, a third site for the customer may be connected via a third CE device, CE3 114, to one or more PE devices, PE4 116. The PE devices, PE3 112 and PE4 116, may be connected to the core 108, as shown.

In accordance with various embodiments, a PE device may be a member of one or more Redundancy Groups. Each Redundancy Group may include two or more PE devices. A Redundancy Group may offer multi-homed connectivity to a set of one or more CE devices, enabling the Redundancy Group to provide service to a customer site (e.g., network)

coupled to the Service Provider network via the set of CE devices. In the example shown in FIG. 1, the two PE devices, PE1 104 and PE2 106, may form a first Redundancy Group that provides services to the first CE device, CE1 102.

Although not shown in this example, a PE device may belong to more than one Redundancy Group without any restrictions or limitations. Moreover, a Redundancy Group may offer multi-homed connectivity to more than one CE device.

The PE devices within a particular Redundancy Group may provide active-active redundancy with load balancing of traffic among the PE devices within the Redundancy Group. In other words, each of the PE devices within the Redundancy Group may be simultaneously active, enabling the traffic to be distributed among the PE devices. In a VPLS system, a CE device typically performs Virtual Local Area Network (VLAN)-based load balancing among PE devices in a Redundancy Group. In other words, the load may be distributed by the CE device in a VPLS system on a Virtual Local Area Network (VLAN) basis.

For example, VLANs x and u may be active on CE1 102. As shown in FIG. 1, CE1 102 may forward traffic for VLAN x via PE1 104. Similarly, CE1 102 may forward traffic for VLAN u via PE2 106. In other words, VLAN x will be active on PE1 104, while VLAN u will be active on PE2 106. As a result, remotely located PE device PE3 112 will see traffic for VLAN x forwarded from PE1 104 via pseudowire 1 (PW1) and traffic for VLAN u forwarded from PE2 106 via pseudowire 2 (PW2). In order to simplify the illustration, only two VLANs are shown in this example. However, an additional pseudowire may be implemented for each additional VLAN that is active on CE1.

Figure 2:
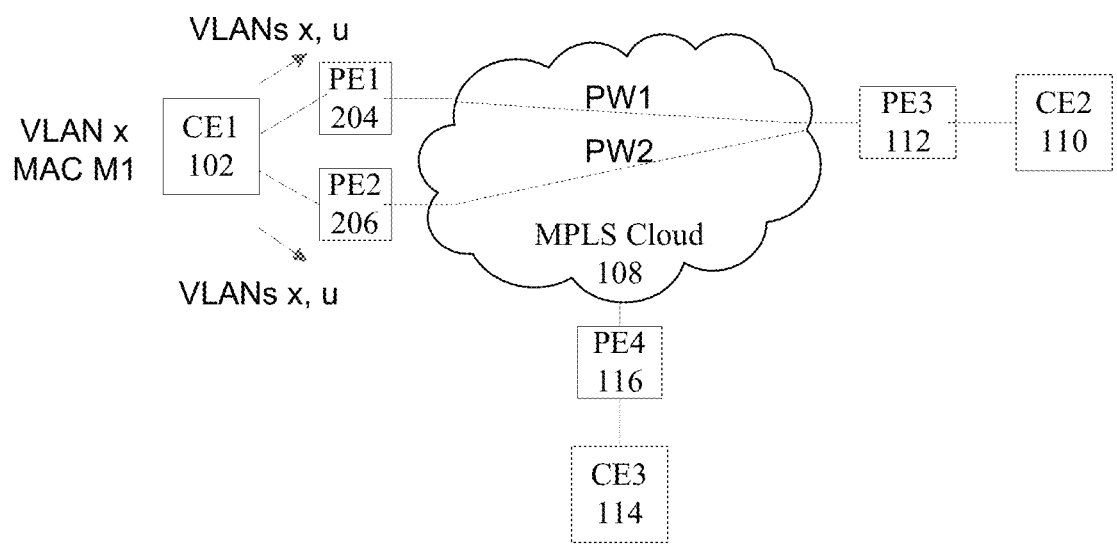
FIG. 2 is a diagram illustrating an example system supporting multi-homing in which E-VPN is implemented.

In contrast, in an E-VPN system, a dual-homed CE device can perform flow-based load balancing among connected PE devices. A flow may be defined by an n-tuple, which includes one or more of the following: source MAC address, destination MAC address, source IP address, destination IP address, source User Datagram Protocol (UDP) or Transmission Control Protocol (TCP) port, and destination UDP or TCP port. As shown in FIG. 2, all of the VLANs x, u that are active on a CE device will be active on both PE1 204 and PE2 206, where both PE1 204 and PE2 206 support E-VPN. Thus, CE1 102 may forward traffic for any of VLANs x, u via either PE1 204 or PE2 206. As a result, remotely located VPLS PE device PE3 112 may see traffic for VLANs x, u forwarded from CE1 102 via both PW1 and PW2. Therefore, traffic from a given MAC address (e.g., M1) on one of the VLANs (e.g., VLAN x) may be received by a remote PE device such as PE3 112 on both PW1 and PW2. Accordingly, a forwarding table implemented on PE3 112 will associate the MAC address M1 with PW1 or PW2, depending on which pseudowire traffic from M1 was received last. When PE3 112 sends traffic to the MAC address M1 using the forwarding table, the traffic sent to the MAC address M1 will oscillate between PW1 and PW2. Unfortunately, this can result in the reordering of traffic.

In accordance with the disclosed embodiments, one or more E-VPN capable devices (e.g., routers and/or switches) may be implemented in a system in which one or more classical VPLS devices (e.g., routers and/or switches) are also implemented. These E-VPN capable devices will be denoted in the examples below as MES (representing E-VPN MPLS Edge Switch), while classical VPLS devices will be denoted by PE (for VPLS Provider Edge). All E-VPN capable devices (MES devices) are also deemed VPLS-capable. Stated another way, MES devices are PE devices that are E-VPN capable.

The disclosed embodiments support "backward compatibility" for E-VPN. More particularly, a CE device can perform flow-based load balancing via MES devices (i.e., PE devices supporting both E-VPN and VPLS). However, through the disclosed embodiments, the MES devices in the Redundancy Group may give the appearance of performing VLAN-based load balancing (e.g., for traffic directed to remote PEs not supporting E-VPN). Operation of classical PE devices remains unmodified. In other words, classical PE devices not supporting E-VPN may continue to perform VLAN-based load balancing.

Figure 3:
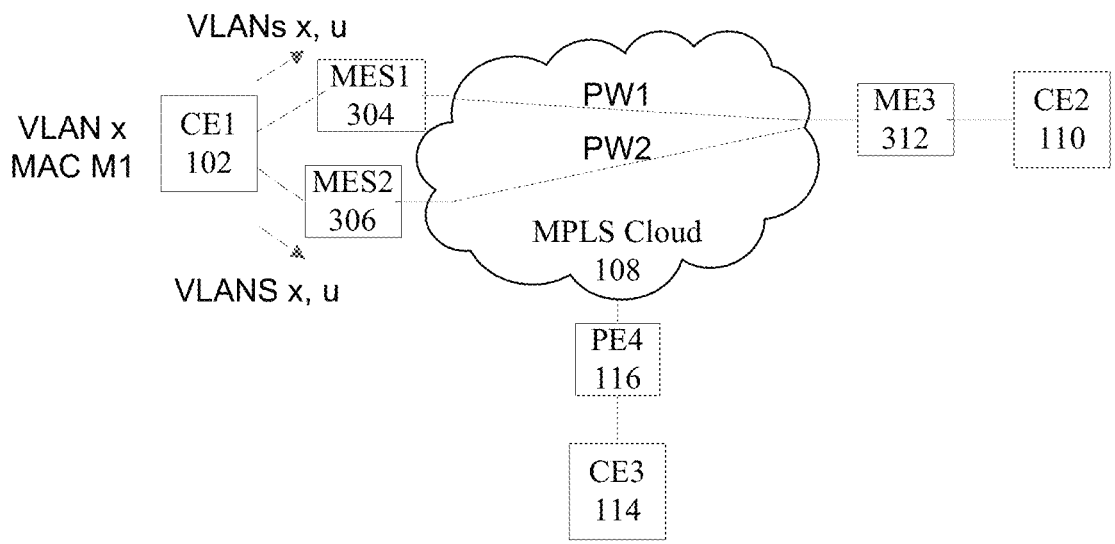
FIG. 3 is a diagram illustrating an example system supporting multi-homing in which various embodiments supporting both E-VPN and VPLS may be implemented.

FIG. 3 is a diagram illustrating an example system supporting multi-homing in which various embodiments supporting both E-VPN and VPLS may be implemented. Classical PE devices (i.e., those not supporting E-VPN), shown here as PE4 116, may continue to perform VLAN-based load balancing for outgoing traffic. However, MES devices MES1 304, MES2 306, and MES3 312 may perform flow-based load balancing. Therefore, a CE device such as CE1 102 may perform flow-based load balancing for traffic that is directed to classical PE devices not supporting E-VPN such as PE4 116.

Although the disclosed embodiments are described with reference to multi-homed CE devices, these examples are merely illustrative. It is important to note that a MES implementing the disclosed embodiments and connected to a single home site would also be interoperable with other PE devices and MESs in the same VPLS instance.

Election of Designated Forwarders

Each of the Redundancy Groups may serve a different one of one or more multi-homed devices. Each of the multi-homed devices may be in a different customer network (or the same customer network). The membership of MES devices in the Redundancy Groups may be mutually exclusive. Alternatively, there may be an overlap of membership among the Redundancy Groups. Thus, at least one of the MES devices in a Redundancy Group may be a member of one or more other Redundancy Groups.

Where two or more MES devices in a Redundancy Group offer redundant connectivity for a customer site (e.g., CE device), multiple Designated Forwarders (one Designated Forwarder per VLAN) may be elected in order to distribute the traffic among the Redundancy Group members. This process of electing different Designated Forwarders for different VLANs on an Ethernet Segment, for purpose of load balancing, may be referred to as "VLAN Carving." VLAN carving may be performed such that the VLANs are distributed evenly among the MES devices serving the same Ethernet segment.

The election of Designated Forwarders for the Redundancy Group may be performed dynamically using a control protocol. More particularly, the MES devices in a Redundancy Group may participate in the process of electing a Designated Forwarder for a VLAN by exchanging information via a Designated Forwarder Election Attribute carried in an Ethernet Segment route. In accordance with various embodiments, the CE may perform flow-based load balancing, while it appears to remote devices that the CE is performing VLAN-based load balancing.

Communications Among Devices

There are two types of VPLS: Border Gateway Protocol (BGP)-based and Label Distribution Protocol (LDP)-based. More particularly, PE devices may communicate with each other via BGP or LDP. LDP is described in RFC 5036, "LDP," L. Andersson et al, October 2007, while BGP is described in RFC 4271, "A Border Gateway Protocol 4 (BGP-4)," Y. Rekhter, et al, January 2006.

BGP is an interdomain routing protocol. More particularly, BGP performs interdomain routing in Transmission-Control Protocol/Internet Protocol (TCP/IP) networks. BGP is an exterior gateway protocol (EGP), which means that it exchanges routing information and performs routing between gateway devices of different autonomous systems. Through the exchange of routing information via BGP, gateway devices can obtain routing information for paths between autonomous systems.

A unique Autonomous System Number (ASN) is allocated to each Autonomous System (AS) for use in BGP routing. An AS may be a collection of connected IP routing prefixes (e.g., including routers and links) within the Internet that are under the control of a common entity or administration (e.g., enterprise network or service provider network) that presents a common, clearly defined routing policy to the Internet. Therefore, the ASNs may uniquely identify each network on the Internet.

In a Multi Protocol Label Switching (MPLS) network, two label switching routers (LSRs) communicate with one another so that they agree on the meaning of the labels used to forward traffic between and through them. LDP defines a set of procedures and messages by which one LSR (Label Switched Router) informs another LSR of the label bindings it has made. The LSR uses this protocol to establish label switched paths through a network by mapping network layer routing information directly to data-link layer switched paths.

The disclosed embodiments may be implemented based, at least in part, via communication among two or more MES devices within a Service Provider Network. Such communications may be achieved via control messages composed in a control protocol such as BGP or LDP. Furthermore, additional information may be obtained by one or more of the MES devices by listening to data messages sent through the MES device(s). As will be described in further detail below, MES devices in a Redundancy Group may operate to enable flow-based load balancing by a CE device via two or more MES devices, while providing the appearance to remote PE devices not supporting E-VPN that load balancing of traffic to those remote PE devices is VLAN-based.

Operation of MES Devices in Redundancy Group

Two or more MES devices in a Redundancy Group may operate together to give the appearance to remotely located PE devices that traffic transmitted by a CE device from a first set of one or more VLANs is forwarded via a first one of the MES devices and traffic transmitted by the CE device from a second set of one or more VLANs is forwarded via a second one of the MES devices. More particularly, each of the MES devices may be statically configured with a corresponding set of VLANs. Alternatively, the MES devices may each be dynamically assigned a corresponding set of VLANs. For example, a set of VLANs may be divided among the MES devices such that a first one of the MES devices is a Designated Forwarder for a first subset of one or more VLANs in the set of VLANs and a second one of the MES devices is a Designated Forwarder for a second subset of one or more VLANs in the set of VLANs. Data traffic may thereafter be labeled by the MES devices to give the appearance that load balancing is VLAN-based, even where this is not the case. In accordance with various embodiments, labeling of data traffic may be performed using pseudowire labels.

Establishment of Pseudowires and Synchronization of Pseudowire Labels

Each MES device (e.g., MES device in a Redundancy Group) may discover each of the other edge nodes in the network and its associated capability (e.g., VPLS or E-VPN). This information may then be used by the MES devices (e.g., in the Redundancy Group) to set up proper forwarding tunnels between the MES devices (e.g., in the Redundancy Group) and the other edge devices in the network. In accordance with various embodiments, the MES devices (e.g., in the Redundancy Group) may participate in VPLS BGP-based auto-discovery per procedures described in RFC 4761 or RFC 6074, "Provisioning, Auto-Discovery, and Signaling in Layer 2 Virtual Private Networks (L2VPNs), Rosen et al, January 2011. Through VPLS BGP-based auto-discovery, each MES device (e.g., in the Redundancy Group) may discover the set of edge devices that are VPLS capable (e.g., PE devices and MES devices). The VPLS capable edge devices may be referred to as Set V. In addition, each MES device (e.g., in the Redundancy Group) may participate in E-VPN auto-discovery procedures such as those described in Internet Draft entitled "BGP MPLS Based Ethernet VPN," draft-raggarwa-sajasssi-12vpn-evpn-04.txt, Aggarwal et al, Sep. 12, 2011. Through E-VPN auto-discovery, each MES device (e.g., in the Redundancy Group) may discover the set of edge devices that are E-VPN capable (e.g., MES devices). The E-VPN capable edge devices may be referred to as Set E. Each MES node (e.g., in the Redundancy Group) can deduce the set of VPLS PEs, which may be referred to as Set P, where Set P=V–E. The set E may represent MES devices, while set P may represent classical VPLS PE devices that do not support E-VPN. Stated another way, a set of network devices that support VPLS but do not support E-VPN (Set P) may be deduced by identifying network devices in the set of network devices that support VPLS (Set V) that are not in the set of network devices that support E-VPN (Set E).

Each MES device (e.g., in a Redundancy Group) can set up forwarding tunnels using information obtained via VPLS and E-VPN auto-discovery procedures. More particularly, for every remote device in set E, the MES device may set up a multiple point-to-point (MP2P) tunnel per the procedures set forth in Internet Draft, "BGP MPLS Based Ethernet VPN," draft-raggarwa-sajassi-12vpn-evpn-04.txt, Aggarwal et al, September 2011. For every remote device in set P, the MES device may set up a pseudowire per VPN instance.

A pseudowire label for each pseudowire may be distributed to all MES devices of the pertinent Redundancy Group. More particularly, a remote PE device may advertise to each PE device in the VPN instance a pseudowire label for a particular Virtual Forwarding Instance (VFI). For example, a first remote PE device may advertise a first pseudowire label, PW1, and a second remote PE device may advertise a second pseudowire label, PW2. Generally, a remote PE device may advertise a pseudowire label in a control message such as an LDP Label Advertisement message or BGP Layer 2 Network Layer Reachability Information (NLRI).

MES devices in the same Redundancy Group (i.e, connected to the same multi-homed site) may synchronize the pseudowire labels that were received from the remote PEs. This procedure may be referred to as "Label Mirroring."

The above procedures may be applied for the setup of tunnels used for transport of unicast and multi-destination frames (e.g., multicast, broadcast, or unknown unicast frames). Where the MPLS network supports Label Switched Multicast (LSM), the procedures for setting up LSM trees are as follows: Every MES device may send an E-VPN Inclusive Multicast Route to remote devices in Set E. In addition, every MES device may send a VPLS-LSM Route to remote nodes in Set P. This may be accomplished using procedures disclosed in Internet Draft entitled "Multicast in VPLS," draft-ietf-12vpn-vpls-mcast-09.txt, Aggarwal et al, Jul. 5, 2011. Both routes may carry the same Tree Identifier (ID). For example, a Provider Multicast Service Interface (PMSI) tunnel attribute of a BGP route may identify the tree. As such, a single tree may be built to span PE and MES devices. Stated another way, a single multicast tree may be implemented for both VPLS and E-VPN devices. The multicast tree may also be set up via multicast Label Distribution Protocol (mLDP). This may be accomplished using procedures disclosed in Internet Draft entitled "Requirements and Framework for Point-to-Multipoint Pseudowires over MPLS PSNs," draft-ietf-pwe3-p2 mp-pw-requirements-05.txt, Jounay et al, Sep. 8, 2011.

Operation of MES Devices to Achieve Forwarding of Data Traffic Using Pseudowires Each MES device in a set of MES devices forming a Redundancy Group may give the appearance to a remote PE device that it is forwarding traffic for a given VLAN by labeling data traffic with a label (e.g., pseudowire label) that was advertised by that remote PE device for the VPN instance associated with that VLAN. FIG. 4 is a process flow diagram illustrating an example method of operating by a MES device in a Redundancy Group to give the appearance that load balancing is VLAN-based. A network device (e.g., MES device) in a set of network devices (e.g., MES devices) may obtain a pseudowire label for a Virtual Local Area Network (VLAN) and a set of one or more MAC addresses for (i.e., reachable in) the VLAN at 402, wherein the set of network devices supports Ethernet Virtual Private Network (E-VPN) and are in the same Redundancy Group such that the set of network devices are coupled to the same customer edge device. In one embodiment, the network device (e.g., Designated Forwarder for the VLAN) may receive the pseudowire label via an advertisement transmitted by a remote PE device (not supporting E-VPN) and obtain the set of one or more MAC addresses by data-path learning on data traffic received by the network device. In another embodiment, the network device (e.g., non-Designated Forwarder for the VLAN) may receive the pseudowire label for the VLAN from another network device (e.g., Designated Forwarder for the VLAN). In addition, the non-Designated Forwarder for the VLAN may receive the set of one or more MAC addresses from another network device (e.g., Designated Forwarder for the VLAN). Alternatively, the non-Designated Forwarder may obtain the set of MAC addresses by data-path learning on data traffic that it receives.

The network device may store the pseudowire label in association with the set of one or more MAC addresses at 404 (e.g., in a forwarding table). Thereafter, the network device may retrieve the pseudowire label from memory (e.g., the forwarding table) as a result of MAC address lookups. The network device may use the pseudowire label to encapsulate data packets associated with the VLAN (e.g., traffic that is transmitted to one of the set of MAC addresses) that are received from the customer edge device at 406.

Figure 5A:
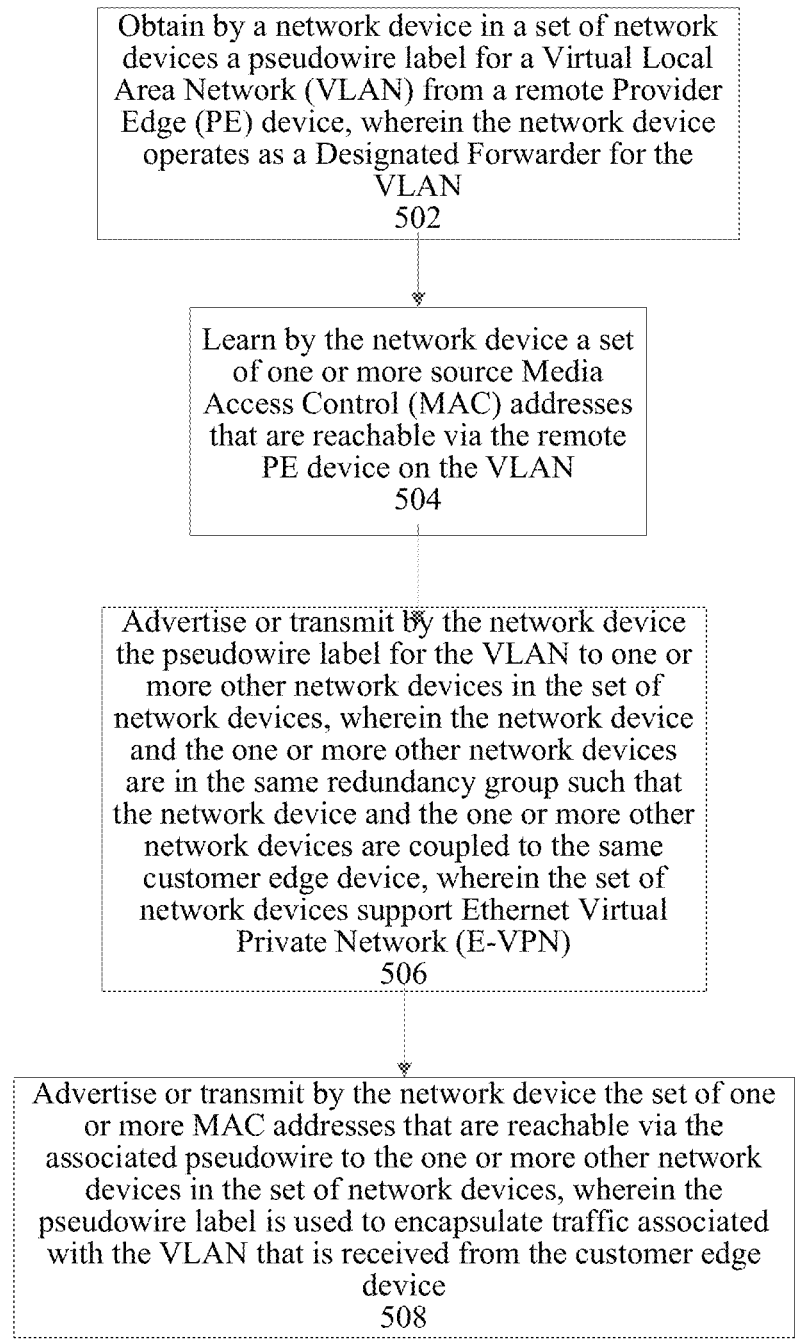
FIG. 5A is a process flow diagram illustrating an example method of operating by a provider edge device supporting E-VPN such as a Designated Forwarder in accordance with various embodiments.

FIG. 5A is a process flow diagram illustrating an example method of operating by a MES device connected to a multi-homed device in accordance with various embodiments. The MES supports E-VPN and may be a Designated Forwarder for a set of one or more VLANs. A network device in a set of network devices (e.g., Redundancy Group) may obtain a pseudowire label for a Virtual Local Area Network (VLAN) at 502, wherein the network device operates as a Designated Forwarder for the VLAN. More particularly, the network device, as Designated Forwarder for the VLAN, may receive the pseudowire label for the VLAN via an advertisement received from a remote PE device that is not in the Redundancy Group. In addition, the network device may learn a set of one or more source Media Access Control (MAC) addresses that are reachable via the remote PE device on the VLAN at 504. The network device may associate the set of MAC addresses with the pseudowire label advertised by the remote PE device for the VLAN (e.g., by storing a mapping between the set of MAC addresses and the pseudowire label). More particularly, the network device may maintain a forwarding table including MAC addresses and corresponding pseudowire labels.

In accordance with various embodiments, all devices supporting E-VPN in the Redundancy Group (referred to as MES devices) use the same pseudowire label for the VLAN when transmitting traffic to a given remote VPLS PE device. Therefore, the network device operating as the Designated Forwarder for the VLAN may relay (e.g., advertise or transmit) the information identifying the pseudowire label and MAC addresses learnt over the associated pseudowire to other devices in the Redundancy Group. Thus, the network device may relay the pseudowire label, advertised by the remote VPLS PE device for the VLAN, to one or more other network devices in the set of network devices at 506, wherein the network device and the one or more other network devices are in the same redundancy group such that the network device and the one or more other network devices are coupled to the same customer edge device, wherein the set of network devices support Ethernet Virtual Private Network (E-VPN). For example, the network device may relay the pseudowire label associated with a remote PE device for the VLAN via BGP (e.g., via a BGP attribute of an Ethernet Segment route). In addition, the network device may advertise or otherwise transmit the set of one or more MAC addresses that are reachable via the associated pseudowire to the one or more other network devices in the set of network devices at 508. For example, this may be accomplished via BGP using E-VPN MAC Advertisement Routes.

Any network device in the set of network devices (Designated Forwarder and non-Designated Forwarder(s)) may use the pseudowire label to encapsulate traffic associated with the VLAN received from the customer edge device and transmitted to one of the set of MAC addresses. Use of the same pseudowire label for all traffic associated with the VLAN that is received by the MES devices from the CE device prevents flip-flopping of MAC address entries on the remote PE device as traffic from the multi-homed customer site is load-balanced between the MES devices.

In this example, the network device operates as a Designated Forwarder for the VLAN. However, the Designated Forwarder for a first VLAN may operate as a non-Designated Forwarder for another, second VLAN. For example, the network device may receive a second pseudowire label for a second VLAN from a Designated Forwarder for the second VLAN, wherein the Designated Forwarder for the second VLAN is one of the one or more other network devices in the set of network devices. In addition, the network device may receive a second set of one or more MAC addresses for the second VLAN from the Designated Forwarder for the second VLAN. The network device may associate the second set of MAC addresses with the second pseudowire label (e.g., by storing a mapping between the second set of MAC addresses and the second pseudowire label). The network device may thereafter use the second pseudowire label to encapsulate traffic associated with the second VLAN (e.g., traffic transmitted to one of the second set of MAC addresses) that is received from the customer edge device.

FIG. 5B is a process flow diagram illustrating an example method of operating by a MES device supporting E-VPN such as a non-Designated Forwarder in accordance with various embodiments. A network device in a set of network devices may receive a pseudowire label for a remote VPLS PE device in a Virtual Local Area Network (VLAN) at 512 from a Designated Forwarder for the VLAN, wherein the Designated Forwarder for the VLAN is one of the set of network devices, wherein the set of network devices support Ethernet Virtual Private Network (E-VPN) and are in the same redundancy group such that the set of network devices are coupled to the same customer edge device. For example, the network device may receive a message such as an advertisement that includes the pseudowire label for the VLAN via BGP (e.g., via a BGP attribute of an Ethernet Segment route). In addition, the network device may receive a set of one or more MAC addresses learnt over the associated pseudowire from the Designated Forwarder for the VLAN at 514. For example, the network device may receive a message such as an advertisement via BGP using E-VPN MAC Advertisement Routes. The non-Designated Forwarder may also obtain the set of MAC addresses by data-path learning on data traffic that it receives.

The network device may associate the set of MAC addresses with the pseudowire label for the remote VPLS PE device. For example, the network device may store a mapping between the set of MAC addresses and the pseudowire label. More particularly, the network device may maintain a forwarding table including MAC addresses and corresponding pseudowire labels. The network device may thereafter use the pseudowire label to encapsulate traffic associated with the VLAN (e.g., traffic transmitted to one of the set of MAC addresses) that is received from the customer edge device at 516, even though the network device is not a Designated Forwarder for the VLAN.

It is important to note that the network device may not be a Designated Forwarder for a first VLAN, but may be a Designated Forwarder for a second VLAN. Therefore, the network device may operate as described above with reference to FIG. 5A with respect to a second VLAN.

Alternatively, the network device may operate as a non-Designated Forwarder for another, second VLAN. Thus, the network device may receive a second pseudowire label for a second VLAN from a Designated Forwarder for the second VLAN, wherein the Designated Forwarder for the second VLAN is another one of the set of network devices. In addition, the network device may receive a second set of one or more MAC addresses for the second VLAN from the Designated Forwarder for the second VLAN. The network device may thereafter use the second pseudowire label to encapsulate traffic associated with the second VLAN that is received from the customer edge device, even though the network device is not the Designated Forwarder for the second VLAN.

When setting up their forwarding tables, the MES devices may associate a Tunnel Adjacency with every MAC address reachable via the MPLS core. More particularly, the tunnel adjacency may correspond to the pseudowire label for MAC addresses reachable through remote PEs, while the tunnel adjacency may correspond to the E-VPN label for MAC addresses reachable through remote MES nodes.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid packet processing system of the disclosed embodiments may be implemented on a general-purpose programmable machine selectively activated or reconfigured by a computer program stored in memory. Such programmable machine may be a network device designed to handle network traffic. Such network devices typically have multiple network interfaces. Specific examples of such network devices include routers, switches, and access points. For example, the packet processing systems of the disclosed embodiments may be implemented via ASR900, ASR9000 and 7600 series routers, and Nexus 7000 series switches available from Cisco Systems, Inc. of San Jose, Calif. The network devices may be specially configured routers such as specially configured router models 1600, 2500, 2600, 3600, 4500, 4700, 7200, 7500, 12000 and Carrier Routing System (CRS) available from Cisco Systems, Inc. of San Jose, Calif. A general architecture for some of these machines will appear from the description given below. Further, the disclosed embodiments may be at least partially implemented on a card (e.g., an interface card) for a network device or a general-purpose computing device.

Each PE device, MES device, and CE device may be implemented via a separate network device. In one embodiment, a network device (e.g., PE device, MES device, or CE device) implementing the disclosed embodiments is a router or switch. Referring now to FIG. 6, an example router 1110 suitable for implementing the disclosed embodiments includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

The interfaces 1168 are typically provided as interface cards (sometimes referred to as "line cards"). Generally, they control the sending and receiving of data packets or data segments over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, Asynchronous Transfer Mode (ATM) interfaces, High-Speed Serial Interface (HSSI) interfaces, Packet over Synchronous Optical Network (POS) interfaces, Fiber Distributed Data Interface (FDDI) interfaces, Local Area Network (LAN) interfaces, Wireless Area Network (WAN) interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router that may be used to implement the disclosed embodiments, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 1161) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
 obtaining, by a first network device in a set of network devices belonging to a first redundancy group, a pseudowire label for a remote Provider Edge (PE) device, wherein:
  the set of network devices belonging to the first redundancy group are all coupled to a first customer edge device,
  the remote PE device is not coupled to the first customer edge device,
  the pseudowire label corresponds to a Virtual Local Area Network (VLAN) on the remote PE device, and
  the first network device operates as a Designated Forwarder for the VLAN;
 identifying, by the first network device, a set of one or more destination Media Access Control (MAC) addresses that are reachable via the remote PE device on the VLAN;
 transmitting, by the first network device, the pseudowire label for the remote PE device to one or more other network devices in the set of network devices belonging to the first redundancy group, wherein the set of network devices belonging to the first redundancy group, including the first network device, are MPLS Edge Switch (MES) devices that support Ethernet Virtual Private Network (E-VPN);
 transmitting, by the first network device, the set of one or more destination MAC addresses that are reachable via the remote PE device on the VLAN to the one or more other network devices in the set of network devices belonging to the first redundancy group, wherein, thereafter, the set of network devices belonging to the first redundancy group, including the first network device, encapsulate traffic received from the first customer edge device with the pseudowire label, when the traffic is destined to one of the set of destination MAC addresses reachable via the remote PE device;
 identifying, by the first network device, on a per VPN instance basis, a set of network devices that support E-VPN;
 identifying, by the network device, a set of network devices that support Virtual Private Local Area Network Service (VPLS);
 identifying a set of network devices that support VPLS but do not support E-VPN by identifying a subset of the set of network devices that support VPLS that are not in the set of network devices that support E-VPN; and
 for each remote node in the set of network devices that support VPLS but do not support E-VPN, setting up a pseudowire.

2. The method as recited in claim 1, further comprising:
 receiving, from the customer edge device on the VLAN, a first traffic packet;
 determining that the first traffic packet is destined to one of the set of destination MAC addresses reachable via the remote PE device; and
 encapsulating the first traffic packet with the pseudowire label.

3. The method as recited in claim 1, further comprising:
 receiving a second pseudowire label for a second remote PE device on a second VLAN from a second network device that is a Designated Forwarder for the second VLAN, wherein the second network is different than the first network device and belongs to the first redundancy group; and
 receiving a second set of one or more destination MAC addresses that are reachable via the second remote PE device on the second VLAN from the second network device;
 associating the second set of one or more MAC addresses with the second pseudowire label;
 receiving, from the customer edge device on the second VLAN, a second traffic packet destined to one of the second set of destination MAC addresses that are reachable via the second remote PE device; and
 encapsulating the second traffic packet with the second pseudowire label.

4. The method as recited in claim 1, further comprising:
 discovering and signaling a single multicast tree for Virtual Private Local Area Network Service (VPLS) PE devices and E-VPN devices servicing the same VPN instance.

5. The method as recited in claim 1, wherein obtaining the pseudowire label for the remote PE device on the VLAN comprises:
 receiving, by the first network device, the pseudowire label from the remote PE device.

6. The method as recited in claim 1, further comprising:
setting up a multipoint-to-point tunnel to each remote node that is in the set of network devices that supports E-VPN.

7. A method, comprising:
receiving, by a first network device in a set of network devices belonging to a first redundancy group, a pseudowire label for a Virtual Local Area Network (VLAN) from a Designated Forwarder for the VLAN, wherein:
  the Designated Forwarder for the VLAN is one of the set of network devices belonging to the first redundancy group,
  the set of network devices belonging to the first redundancy group, including the first network device, are MPLS Edge Switch (MES) devices that support Ethernet Virtual Private Network (E-VPN), and
  the set of network devices belonging to the first redundancy group are all coupled to a first customer edge device;
receiving, by the first network device, a set of one or more destination Media Access Control (MAC) addresses for the VLAN from the Designated Forwarder for the VLAN;
receiving, from the first customer edge device on the VLAN, a first traffic packet destined to one of the set of destination MAC addresses;
encapsulating, by the first network device, the first traffic packet, with the pseudowire label;
identifying, by the first network device, on a per VPN instance basis, a set of network devices that support E-VPN;
identifying, by the network device, a set of network devices that support Virtual Private Local Area Network Service (VPLS);
identifying a set of network devices that support VPLS but do not support E-VPN by identifying a subset of the set of network devices that support VPLS that are not in the set of network devices that support E-VPN; and
for each remote node in the set of network devices that support VPLS but do not support E-VPN, setting up a pseudowire.

8. The method as recited in claim 7, further comprising:
setting up a multipoint-to-point tunnel to each remote node that supports E-VPN.

9. The method as recited in claim 7, further comprising:
for each remote node that supports Virtual Private Local Area Network Service (VPLS) but does not support E-VPN, setting up a pseudowire.

10. The method as recited in claim 7, further comprising:
associating the set of one or more destination MAC addresses with the pseudowire label for the VLAN.

11. The method as recited in claim 7, further comprising:
discovering and signaling a single multicast tree for Virtual Private Local Area Network Service (VPLS) Provider Edge (PE) devices and E-VPN devices.

12. The method as recited in claim 7, wherein the first network device is a Designated Forwarder for a second VLAN, the method further comprising:
encapsulating, by the first network device, a second traffic packet received from the customer edge device on the second VLAN and addressed to one of a second set of destination MAC addresses with a second pseudowire label.

13. The method as recited in claim 7, further comprising:
receiving, by the first network device, a second pseudowire label for a second VLAN from a Designated Forwarder for the second VLAN, wherein the Designated Forwarder for the second VLAN is one of the set of network devices belonging to the first redundancy group, different than the first networking device;
receiving, by the first network device, a second set of one or more destination MAC addresses for the second VLAN from the Designated Forwarder for the second VLAN; and
encapsulating, by the first network device, a second traffic packet received from the customer edge device on the second VLAN and addressed to one of the second set of destination MAC addresses with the second pseudowire label.

14. The method as recited in claim 7, further comprising:
participating in electing the first network device as the Designated Forwarder for the VLAN.

15. An apparatus, comprising:
a processor; and
a memory, at least one of the processor or the memory being adapted for:
  obtaining, by a first network device in a set of network devices belonging to a first redundancy group, a pseudowire label for a remote Provider Edge (PE) device, wherein:
    the set of network devices belonging to the first redundancy group are all coupled to a first customer edge device,
    the remote PE device is not coupled to the first customer edge device, and
    the pseudowire label corresponds to a Virtual Local Area Network (VLAN) on the remote PE device;
  identifying, by the first network device, a first set of one or more Media Access Control (MAC) addresses that are reachable via the remote PE device on the VLAN;
  transmitting, by the first network device, the pseudowire label for the remote PE device to one or more other network devices in the set of network devices belonging to the first redundancy group, wherein the set of network devices belonging to the first redundancy group, including the first network device, are MPLS Edge Switch (MES) devices that support Ethernet Virtual Private Network (E-VPN);
  transmitting, by the first network device, the set of one or more destination MAC addresses that are reachable via the PE device on the VLAN to the one or more other network devices in the set of network devices belonging to the first redundancy group, wherein, thereafter, the set of network devices belonging to the first redundancy group, including the first network device, encapsulate traffic received from the first customer edge device with the pseudowire label, when the traffic is destined to one of the set of destination MAC addresses reachable via the remote PE device;
  identifying, by the first network device, on a per VPN instance basis, a set of network devices that support E-VPN;
  identifying, by the network device, a set of network devices that support Virtual Private Local Area Network Service (VPLS);
  identifying a set of network devices that support VPLS but do not support E-VPN by identifying a subset of the set of network devices that support VPLS that are not in the set of network devices that support E-VPN; and
  for each remote node in the set of network devices that support VPLS but do not support E-VPN, setting up a pseudowire.

16. The apparatus as recited in claim 15, at least one of the processor or the memory being further configured for:
  receiving, from the customer edge device on the VLAN, a first traffic packet;
  determining that the first traffic packet is destined to one of the set of destination MAC addresses reachable via the remote PE device; and
  encapsulating the first traffic packet with the pseudowire label.

17. The apparatus as recited in claim 15, at least one of the processor or the memory being adapted for:
  participating in dividing a set of VLANs among the first network device and the one or more other network devices belonging to the first redundancy group such that a first subset of one or more VLANs in the set of VLANs is assigned to the first network device and a second subset of one or more VLANs in the set of VLANs is assigned to the one or more other network devices belonging to the first redundancy group, wherein the first subset includes the VLAN.

18. A non-transitory computer-readable medium storing thereon computer-readable instructions that, when executed, cause a first network device in a set of network belonging to a first redundancy group to:
  obtain a pseudowire label for a remote Provider Edge (PE) device, wherein:
    the set of networking devices belonging to the first redundancy group are all coupled to a first customer edge device,
    the remote PE device is not coupled to the first customer edge device, and
    the pseudowire label corresponds to a Virtual Local Area Network (VLAN) on the remote PE device;
  obtain a set of one or more destination Media Access Control (MAC) addresses reachable via the remote PE device on the VLAN, wherein the set of network devices belonging to the first redundancy group, including the first network device, are MPLS Edge Switch (MES) devices that support Ethernet Virtual Private Network (E-VPN);
  store the pseudowire label in a forwarding table such that the pseudowire label is associated with the set of one or more destination MAC addresses;
  receive, from the customer edge device on the VLAN, a first traffic packet addressed to one of the one of the set of one or more destination MAC addresses;
  encapsulate the first traffic packet with the pseudowire label associated with the one of the set of one or more destination MAC addresses in the forwarding table;
  identifying, by the first network device, on a per VPN instance basis, a set of network devices that support E-VPN;
  identifying, by the network device, a set of network devices that support Virtual Private Local Area Network Service (VPLS);
  identifying a set of network devices that support VPLS but do not support E-VPN by identifying a subset of the set of network devices that support VPLS that are not in the set of network devices that support E-VPN; and
  for each remote node in the set of network devices that support VPLS but do not support E-VPN, setting up a pseudowire.

19. The non-transitory computer-readable medium as recited in claim 18, wherein the first network device is a Designated Forwarder for the VLAN, the computer-readable instructions further causing the first network device to:
  transmit the pseudowire label and the set of one or more MAC addresses to other network devices in the set of network devices belonging to the first redundancy group.

20. The non-transitory computer-readable medium as recited in claim 19, further comprising:
  instructions for participating in electing the Designated Forwarder for the VLAN.

21. The non-transitory computer-readable medium as recited in claim 18, wherein:
  the first network device is not a Designated Forwarder for the VLAN, and
  the pseudowire label and the set of one or more destination MAC addresses have been received from a Designated Forwarder for the VLAN.

22. The non-transitory computer-readable medium as recited in claim 21, wherein the computer-readable instructions further cause the first networking device to:
  participate in electing the Designated Forwarder for the VLAN.

* * * * *